United States Patent [19]

Lefevre et al.

[11] Patent Number: 5,071,082
[45] Date of Patent: Dec. 10, 1991

[54] SPOOL FOR OPTIC FIBER AND METHOD FOR WINDING WITHOUT STRESS ON OPTIC FIBER

[75] Inventors: Hervë Lefevre, Paris; Jean P. Bettini, Perthes; Serge Botti, Viroflay, all of France

[73] Assignee: Thomson-CSF, Paris, France

[21] Appl. No.: 511,936

[22] Filed: Apr. 17, 1990

Related U.S. Application Data

[63] Continuation of Ser. No. 256,573, Oct. 12, 1988, abandoned.

[30] Foreign Application Priority Data

Oct. 13, 1987 [FR] France ................. 87 14097

[51] Int. Cl.⁵ ............... B65H 54/00; B65H 75/24
[52] U.S. Cl. .................. 242/47; 242/110.1; 242/115; 242/117; 242/118.4
[58] Field of Search ............. 242/47, 53, 110, 110.1, 242/110.2, 110.3, 115, 116, 117, 118.4, 118.41, 118.5, 118.6, 118.7, 118.8, 159, 176, 178

[56] References Cited

U.S. PATENT DOCUMENTS

| | | | |
|---|---|---|---|
| 1,682,309 | 8/1928 | Schoenfeld | 242/110.1 |
| 1,869,408 | 8/1932 | Bungay | 242/118.4 |
| 1,885,192 | 11/1932 | Elssner et al. | 242/110.1 |
| 1,901,226 | 3/1933 | Carter | 242/110.1 |
| 1,928,979 | 10/1933 | Levison | 242/110.1 X |
| 1,980,468 | 11/1934 | Brauer | 242/110.1 X |
| 2,338,933 | 1/1944 | Grauer | 242/110.1 |
| 3,330,499 | 7/1967 | Gooding | 242/118.4 X |
| 4,219,274 | 8/1980 | Dabby et al. | 242/115 X |
| 4,657,202 | 4/1987 | Sauber | 242/117 |
| 4,657,203 | 4/1987 | Crawford | 242/117 X |
| 4,696,438 | 9/1987 | Myers | 242/118.41 |

FOREIGN PATENT DOCUMENTS

8517450  9/1985  Fed. Rep. of Germany .
2555560  5/1985  France .

*Primary Examiner*—Stanley N. Gilreath
*Attorney, Agent, or Firm*—Oblon, Spivak, McClelland, Maier & Neustadt

[57] ABSTRACT

A spool for optic fibers and its winding method are disclosed. The cylinder of the spool has grooves in which rods are placed during the winding operation. Thus, the circumference of the spool is greater than that of the cylinder. After winding, the rods are removed so that the winding stresses are relaxed.

5 Claims, 2 Drawing Sheets

SPOOL FOR OPTIC FIBER AND METHOD FOR WINDING WITHOUT STRESS ON OPTIC FIBER

This application is a continuation of application Ser. No. 256,573, filed on Oct. 12, 1988, now abandoned.

BACKGROUND OF THE INVENTION

1. Field of the Invention

The invention concerns a spool for optic fibers and, in particular, a winding method by which an optic fiber can be wound without imposing stress on the fiber.

2. Description of the Prior Art

The standard method used to wind a fiber in multiple layers creates micro-curves which may increase losses or produce polarization couplings in polarization-maintaining fibers. For, while the first layer of the fiber may be made with contiguous turns, the next one is wound with a reverse spiral pitch and there is overlapping, at each turn, of the fiber on the bottom layer, thus creating micro-curves because of the tension needed for winding.

The invention provides a solution to overcome this drawback.

SUMMARY OF THE INVENTION

The invention therefore concerns a spool for optic fibers comprising a cylinder, on which an optic fiber has to be wound, and comprising two end plates on either side of the fiber to hold the fiber during and after winding, wherein said cylinder has one or more grooves on its periphery, each groove being made along a generatrix of the cylinder and forming breaks in the evenness of the external surface of the cylinder.

The invention also concerns a winding method for optic fibers using a spool, said method comprising the following steps:

the positioning, in the grooves, of removable parts forming projections from the external surface of the cylinder so as to increase the winding circumference of an optic fiber;

the winding of an optic fiber on the cylinder provided with removable parts;

the removal of the removable parts, which has the effect of relaxing the winding tension of the optic fiber and of removing the stresses caused by this tension.

BRIEF DESCRIPTION OF THE DRAWINGS

The various objects and features of the invention will appear more clearly from the following description, given by way of an example and made with reference to the appended figures of which.

DESCRIPTION OF PREFERRED EMBODIMENTS

Figure 1:
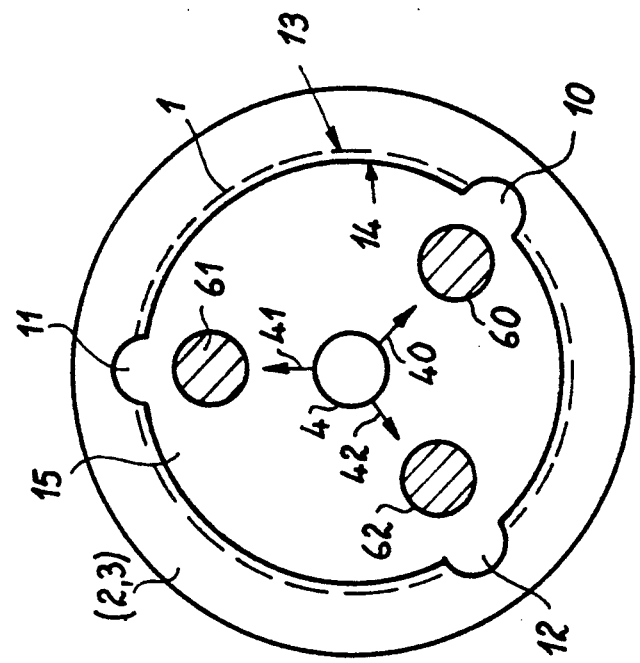
FIG. 1 shows an embodiment of the spool according to the invention.
Figure 3:
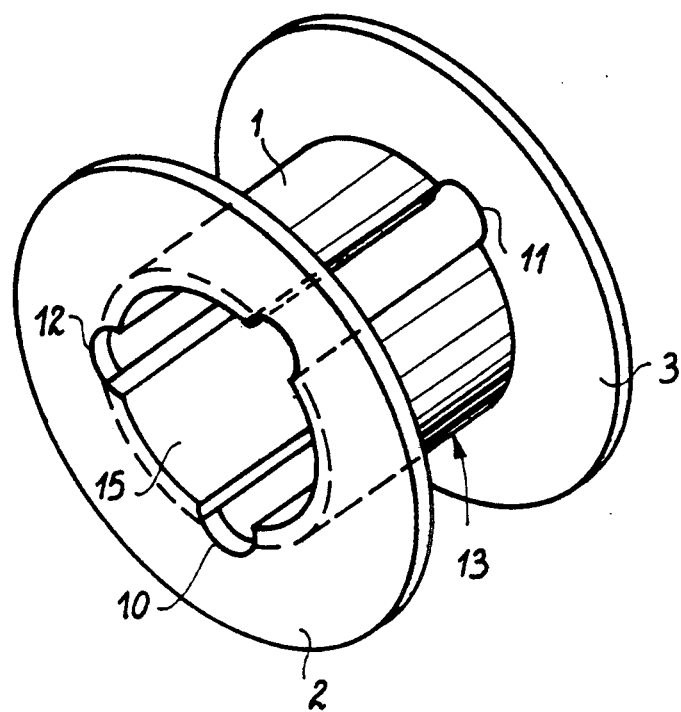
FIG. 3 shows a view in perspective of a spool according to the invention.

Referring to FIGS. 1 and 3, we shall firstly describe an embodiment of a spool according to the invention. This spool has a cylinder 1 with an external surface 13 which will be used as the support for the winding of an optic fiber. The interior of the cylinder is hollow and defines a cavity 15.

The ends of the cylinder have end plates 2 and 3 which are used to define the length of a cylinder along which the fiber will be wound.

According to the invention, the cylinder has grooves 10, 11, 12, made along generatrices of the cylinder According to FIGS. 1 and 3, these grooves are cuts, parallel to the axis of the cylinder, made in the wall of the cylinder The end plates 2 and 3 are also cut out in the same shape as the cuts.

In FIGS. 1 and 3, the number of grooves (or cuts) is three, but a different number may be planned without going beyond the scope of the invention.

In relation with the, spool as thus described, the invention also concerns a winding method.

According to this winding method, first of all, removable parts 60, 61, 62, shaped like rods and forming projections on the outer surface 13 of the cylinder 1, are placed in the grooves 10 to 12. As an example, in FIG. 1, these parts 60 to 62 are cylindrical.

The positioning of the parts 60 to 62 is done through the inside of the cylinder 1. A chuck device, having retractable rods 40, 41, 42, pushes the removable parts 60 to 62 towards the inner surface 14 of the cylinder 1, places them in the grooves 10 to 12 and keeps them in position so that they project outwards from the cylinder. The chuck assembly may be moved relative to the spool so that any of the rods 60-62 may be placed in any of the grooves 10-12. Thus, the rods may be considered interchangeable in regard to the grooves. This allows the spools to be easily inserted or changed on the chuck.

An optic fiber is then wound on the cylinder 1, the parts 60 to 62 then increasing the winding periphery of the fiber.

Finally, the chuck 4, by means of the retractable rods 40, 41, 42, commands the removal of the removable parts 60, 61, 62. The previously wound fiber is then directly on the outer surface 13 of the cylinder 1. The tension inevitably applied to the fiber during the winding stage then disappears.

Figure 2:
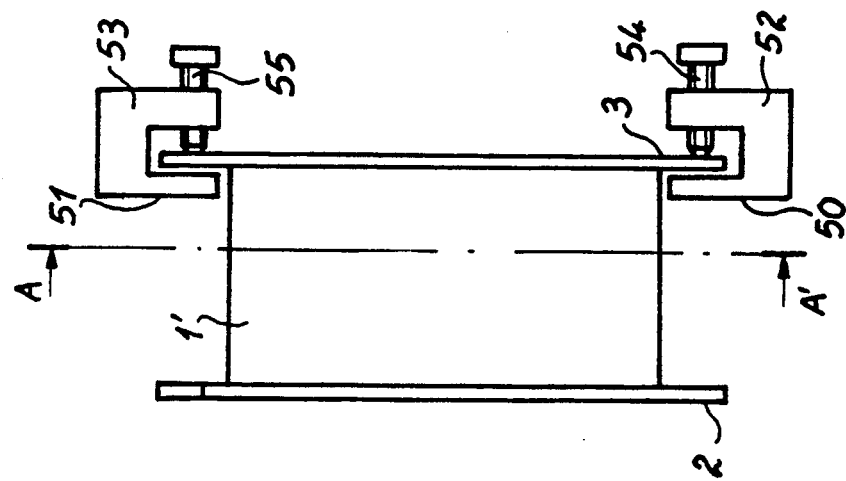
FIG. 2 shows a side view of an alternative embodiment of a spool according to the invention.
Figure 4:
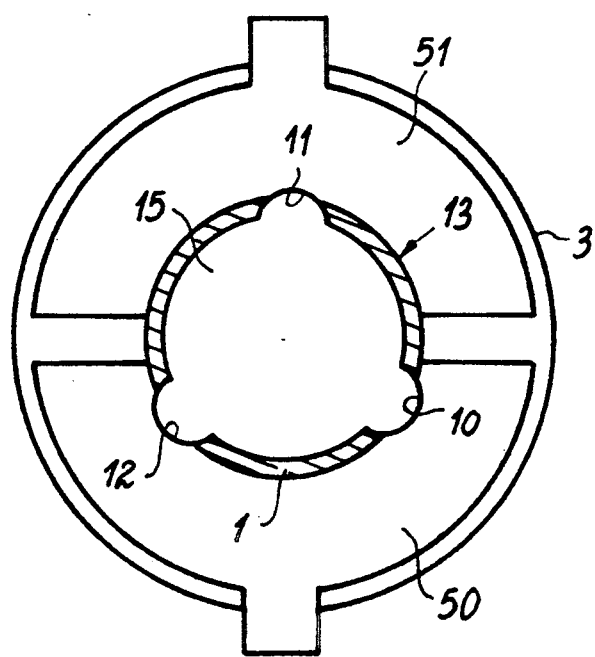
FIG. 4 shows a sectional view of an embodiment of the invention which demonstrates grooves and flanges.

The example of FIG. 1 provides for three removable parts, 60, 61, 62, with their corresponding rectractable rods 40, 41, 42, but it is quite clear that a different number of these elements could be chosen Referring to FIGS. 2 and 4, we shall describe an alternative example of the device and the method of the invention enabling the removal of the stresses created in the fiber during the winding stage.

According to FIGS. 2 and 4, there is provision for one or more removable flanges (two flanges in the embodiment shown) placed against the inner face of one of the two end plates 2 or 3.

FIG. 2 shows two flanges 50 and 51, placed against the inner surface of the end plate 3. These flanges are held in position by parts 52, 53, which straddle the end plate 3. Fixing means, such as screws 54, 55, keep the removable flanges 50, 51, in position. FIG. 2 shows cylinder 1' which does not have grooves.

According to the method of the invention, before a fiber is wound, the removable flanges 50 and 51 are placed on the spool and immobilized, by means of screws 54 and 55, against the end plate 3. Then the fiber is wound and then the removable flanges 50 and 51 are removed. The wound fiber is then less compressed, and the stresses due to the winding operation are entirely or partly removed.

The invention thus enables the use of an ordinary spool support in which grooves (three for example) have been milled. Rods mounted on a rectractable chuck are placed in these grooves so much so that the turns are wound with a perimeter greater than that of the spool support. After winding, these rods are removed, thus relaxing tension, and hence, removing unwanted micro-curves.

This method is furthermore improved by placing removable flanges in the height of the spool support (FIG. 2) i.e. attaching the flanges 50, 51 to the end plate 3. In removing these flanges, the turns of one and the same layer of optical fiber are moved outward, thus releasing the upper layer which can get embedded in the interstices of the previous layer.

Finally a spool is obtained where the tension of the fiber has been completely relaxed, thus removing the micro-curves that generate losses and polarization couplings. For example, a spool with a fiber of 250 meters is made, set in a support with an internal diameter of 25 mm, an external diameter of 36 mm. and a height of 14 mm.

It is quite clear that the above description has been made solely as a non-restrictive example. Other alternative embodiments can be considered without going beyond the scope of the invention. In particular, the digital example and the products used to make the material according to the invention have been given only to illustrate the description.

What is claimed is:

1. A system for winding an optical fiber comprising:
    a spool formed of a cylinder having a hollow cavity;
    said spool having a first end plate and a a second end plate attached to said cylinder;
    a flange attachable to one of said first and second end plates, said flange straddling said end plate and having a portion extending into the space between the end plates and adjacent the cylinder so as to be engaged by the optical fiber being wound onto the spool adjacent the end plate to which the flange is attached so that the optical fiber is spaced therefrom;
    screw means for attaching and detaching said flange to one of said first and second end plates; and
    a plurality of interchangeable, removable parts for insertion into and removal from a plurality of grooves located along said cylinder's periphery and extending through said plates; wherein the removal of either said flange or said interchangeable parts acts to release tension on said optical fiber.

2. A system according to claim 1, wherein: when said plurality of removable parts are inserted into the plurality of grooves, the circumference of the hollow cylinder is increased.

3. A system according to claim 2, wherein: said plurality of removable parts when inserted in said plurality of grooves make contact with said optical fiber.

4. A method for winding an optical fiber on a spool having a cylinder with end plates with a plurality of grooves located along said cylinder's periphery and extending through said plates, said method comprising the steps of:
    a) inserting a cylindrical and interchangeable, removable part into one groove of said plurality of grooves prior to winding the optical fiber by means of a chuck having at least one retractable rod which pushes said removable part into said one groove and attaching a flange to an end plate of the spool with a screw means so as to straddle said end plate, said flange having a portion extending into the space between the end plates and adjacent the cylinder so as to be engaged by the optical fiber being wound onto the spool adjacent the end plate to which the flange is attached so that the optical fiber is spaced therefrom;
    b) winding the optical fiber onto said cylinder; and
    c) removing said removable part from said one groove by means of said chuck by said retractable rod which removes said removable part from said one groove and removing said flange from said end plate;
    d) wherein the removal of said removable parts and flange acts to release tension on said optical fiber.

5. A system according to claim 4, wherein: the chuck is located in the center of said hollow region of the cylinder.

* * * * *